(12) United States Patent
Chen et al.

(10) Patent No.: US 12,189,435 B2
(45) Date of Patent: Jan. 7, 2025

(54) FOLDABLE APPARATUS AND TERMINAL DEVICE

(71) Applicant: Huawei Technologies Co., Ltd., Shenzhen (CN)

(72) Inventors: Yiling Chen, Shanghai (CN); Wei Liu, Yokohama (JP); Guangyu Zhang, Shanghai (CN); Wenji An, Shanghai (CN); Ying Li, Shanghai (CN); Xiaoju Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 17/784,991

(22) PCT Filed: Oct. 30, 2020

(86) PCT No.: PCT/CN2020/125220
§ 371 (c)(1),
(2) Date: Jun. 13, 2022

(87) PCT Pub. No.: WO2021/114944
PCT Pub. Date: Jun. 17, 2021

(65) Prior Publication Data
US 2023/0013135 A1    Jan. 19, 2023

(30) Foreign Application Priority Data

Dec. 14, 2019  (CN) .......................... 201911287174.X (51) Int. Cl.
*G06F 1/16*     (2006.01)
*G09F 9/30*     (2006.01)
*H01Q 1/22*     (2006.01)

(52) U.S. Cl.
CPC .......... G06F 1/1683 (2013.01); G06F 1/1616 (2013.01); G06F 1/1652 (2013.01);
(Continued)

(58) Field of Classification Search
CPC .... G06F 1/1683; G06F 1/1616; G06F 1/1652; G06F 1/1681; G06F 1/1698; G09F 9/301;
(Continued)

(56) References Cited

U.S. PATENT DOCUMENTS 9,917,347 B2 *   3/2018   Bologna .............. H01Q 1/2266
11,025,770 B2 *  6/2021   Kwon .................. G06F 1/1643
(Continued)

FOREIGN PATENT DOCUMENTS

CN          1703056 A      11/2005
CN          101155199 A     4/2008
(Continued)

*Primary Examiner* — Rockshana D Chowdhury
(74) *Attorney, Agent, or Firm* — Leydig, Voit & Mayer, Ltd.

(57) ABSTRACT

A foldable apparatus is provided. The foldable apparatus includes a first foldable part, a middle bending part, and a second foldable part that are connected in sequence. The first foldable part and the second foldable part can rotate relative to each other based on the middle bending part. A first wireless communication chip is disposed in the first foldable part. A second wireless communication chip is disposed in the second foldable part. In the foldable apparatus, wireless communication is used to replace conventional physical wiring for internal signal transmission. The loss of a communication carrier is reduced through wireless communication. This ensures that stable transmission performance between the first foldable part and the second foldable part.

19 Claims, 5 Drawing Sheets

(52) U.S. Cl.
CPC ........... *G09F 9/301* (2013.01); *H01Q 1/2283* (2013.01); *H01Q 1/2291* (2013.01)

(58) Field of Classification Search
CPC .... H01Q 1/2283; H01Q 1/2291; H01Q 13/10; H01Q 1/38; H01Q 1/243; H04M 1/0268; H04M 1/022; H04M 1/026; H04M 1/0214; H04M 1/0216
See application file for complete search history.

(56) References Cited

U.S. PATENT DOCUMENTS

| | | | | |
|---|---|---|---|---|
| 11,211,961 | B2* | 12/2021 | Noh | H04M 1/0245 |
| 11,510,328 | B2* | 11/2022 | Kim | H04M 1/0216 |
| 11,528,349 | B2* | 12/2022 | Kim | H04M 1/0216 |
| 11,586,243 | B2* | 2/2023 | Yildiz | G06F 1/1681 |
| 11,616,865 | B2* | 3/2023 | Jeong | H04M 1/0216 |
| | | | | 455/566 |
| 11,619,979 | B2* | 4/2023 | Cavallaro | G06F 1/203 |
| | | | | 361/679.01 |
| 11,740,660 | B2* | 8/2023 | Kim | G06F 1/1618 |
| | | | | 361/679.01 |
| 11,785,378 | B2* | 10/2023 | Jung | H04M 1/0214 |
| | | | | 381/91 |
| 11,862,844 | B2* | 1/2024 | Park | H01Q 5/35 |
| 11,870,922 | B2* | 1/2024 | Lee | G06F 3/1431 |
| 11,886,238 | B2* | 1/2024 | Shin | G06F 1/1616 |
| 2004/0106428 | A1 | 6/2004 | Shoji | |
| 2013/0084796 | A1 | 4/2013 | Kerr | |
| 2013/0249743 | A1 | 9/2013 | Tseng | |
| 2014/0355195 | A1 | 12/2014 | Kee et al. | |
| 2015/0233162 | A1 | 8/2015 | Lee et al. | |
| 2017/0061836 | A1 | 3/2017 | Kim et al. | |
| 2017/0117611 | A1 | 4/2017 | Lepe et al. | |
| 2022/0147098 | A1* | 5/2022 | Stewart | G06F 1/1677 |
| 2022/0386487 | A1* | 12/2022 | Lee | G06F 1/1616 |
| 2023/0198131 | A1* | 6/2023 | Lee | H01Q 1/38 |
| | | | | 343/702 |

FOREIGN PATENT DOCUMENTS

| | | |
|---|---|---|
| CN | 104994194 A | 10/2015 |
| CN | 109193115 A | 1/2019 |
| CN | 208401905 U | 1/2019 |
| CN | 109660642 A | 4/2019 |
| CN | 110072014 A | 7/2019 |
| CN | 110491285 A | 11/2019 |
| CN | 209593488 U | 11/2019 |
| CN | 209626405 U | 11/2019 |
| EP | 1355221 A2 | 10/2003 |

* cited by examiner

FOLDABLE APPARATUS AND TERMINAL DEVICE

CROSS-REFERENCE TO RELATED APPLICATIONS

This application is a national stage of International Application No. PCT/CN2020/125220, filed on Oct. 30, 2020, which claims priority to Chinese Patent Application No. 201911287174.X, filed on Dec. 14, 2019. Both of the aforementioned applications are hereby incorporated by reference in their entireties.

TECHNICAL FIELD

Embodiments of this application relate to the field of electronic device technologies, and in particular, to a foldable apparatus and a terminal device.

BACKGROUND

With application of a flexible display technology in a wireless terminal device, a foldable technology becomes an important development direction of a terminal device. In the conventional technology, a foldable terminal generally includes a flexible display and electronic control structures disposed on the flexible display. The flexible display includes a first foldable part, a middle bending part, and a second foldable part that are connected in sequence. The electronic control structures may be a plurality of main circuit boards disposed on the first foldable part and the second foldable part. An electronic control structure on the first foldable part transmits a signal to an electronic control structure on the second foldable part through physical wiring such as a flexible circuit board and a radio frequency signal line. As bending times of the flexible display increases, loss is generated on the physical wiring, which results in decreased mechanical strength, and affects transmission performance between the main circuit boards.

SUMMARY

One of objectives of embodiments of this application is to provide a foldable apparatus, to solve a technical problem in the conventional technology that loss is generated on physical wiring, which results in decreased mechanical strength, and affects transmission performance between main circuit boards.

Technical effects to be achieved in this application are implemented by using the following solutions.

A foldable apparatus is provided. The apparatus includes:
a foldable body, including a first foldable part, a middle bending part, and a second foldable part that are connected in sequence. The first foldable part and the second foldable part can rotate relative to each other based on the middle bending part.

A first wireless communication chip is disposed in the first foldable part. A second wireless communication chip is disposed in the second foldable part. The first foldable part and the second foldable part perform wireless communication by using the first wireless communication chip and the second wireless communication chip.

The technical solutions of this application have the following advantages: The first wireless communication chip and the second wireless communication chip are disposed in the foldable apparatus, so that the first foldable part and the second foldable part can perform wireless communication by using the first wireless communication chip and the second wireless communication chip. That is, wireless communication is used to replace conventional physical wiring for internal signal transmission. When the foldable body is frequently bent for working, loss of a communication carrier is reduced through wireless communication. This ensures transmission performance between the first foldable part and the second foldable part. In addition, an increase of a transmit signal does not occupy rotation space. This improves a rate and a capacity in terms of signal transmission efficiency, provides scalability, and can accommodate a gradually increased quantity of bus signals.

In an embodiment, the foldable apparatus further includes a support assembly. The support assembly includes a first support plate, a rotating shaft, and a second support plate that are connected in sequence. The first support plate is rotationally connected to the second support plate through the rotating shaft. The first support plate is connected to and supports the first foldable part, the second support plate is connected to and supports the second foldable part, and the rotating shaft is disposed opposite to the middle bending part.

According to the foregoing solution, when a user touches a flexible display, the first support plate and the second support plate can ensure flatness of the foldable body or another carrier mechanism, thereby avoiding collapse of the foldable body, and bending of the first foldable part and the second foldable part.

In an embodiment, the first wireless communication chip is electrically connected to a first electronic control structure and a first radiator. The first electronic control structure is disposed in the first foldable part and is electrically connected to the first foldable part. The first wireless communication chip is configured to transmit a bus signal and/or a radio frequency signal in the first electronic control structure to the first radiator. The second wireless communication chip is electrically connected to a second electronic control structure and a second radiator. The second electronic control structure is disposed in the second foldable part and is electrically connected to the second foldable part. The second wireless communication chip is configured to transmit a bus signal and/or a radio frequency signal in the second electronic control structure to the second radiator. The first wireless communication module and the second wireless communication module perform wireless communication through the first radiator and the second radiator.

According to the solution, a wireless communication link is established inside the foldable apparatus between the first radiator and the second radiator, to replace the physical wiring used for signal transmission. A high-frequency signal is transmitted at a high rate, thereby implementing wireless transmission of the bus signal and/or the radio frequency signal between the first electronic control structure and the second electronic control structure.

In an embodiment, the first radiator and the second radiator are disposed on the rotating shaft and are spaced apart.

According to the solution, a wireless communication link inside the rotating shaft is established between the first radiator and the second radiator that are disposed on the rotating shaft and are spaced apart, to replace the physical wiring used for signal transmission. The high-frequency signal is transmitted at a high rate, thereby implementing wireless transmission of the bus signal between the first electronic control structure and the second electronic control structure.

In an embodiment, both the first radiator and the second radiator are millimeter-wave antennas.

According to the solution, the first radiator and the second radiator implement high-performance signal transmission in a short distance and low power condition.

In an embodiment, both the first radiator and the second radiator are slot antennas formed through slotting on the rotating shaft.

According to the solution, neither the first radiator nor the second radiator needs to occupy too much space of a structure of the rotating shaft. This does not affect structure stability of the rotating shaft.

In an embodiment, the first radiator is integrated into the first wireless communication chip, and the second radiator is integrated into the second wireless communication chip.

According to the solution, the first radiator and the second radiator do not occupy space in an internal structure of the rotating shaft, and do not affect the structure of the rotating shaft. This improves stability of the rotating shaft.

In an embodiment, the foldable apparatus further includes a coating medium covering the first radiator and the second radiator.

According to the solution, signal interconnection and transmission are promoted, and the coating medium ensures stability of radio signal transmission between the first radiator and the second radiator.

In an embodiment, the foldable apparatus further includes a shield layer disposed on an outer layer of the coating medium and used to isolate a signal in the coating medium from an external signal.

According to the solution, signal leakage between the first radiator and the second radiator is avoided.

Another objective of embodiments of this application is to provide a terminal device, to solve a technical problem in the conventional technology that loss is generated on the physical wiring, which results in decreased mechanical strength, and affects transmission performance between main circuit boards.

Technical effects to be achieved in this application are implemented by using the following solutions.

A terminal device is provided. The device includes the foldable apparatus described above.

The technical solutions of this application have the following advantages: A first wireless communication chip and a second wireless communication chip are disposed in the terminal device, so that a first foldable part and a second foldable part can perform wireless communication by using the first wireless communication chip and the second wireless communication chip. That is, wireless communication is used to replace conventional physical wiring for internal signal transmission. When a foldable body is frequently bent for working, loss of a communication carrier is reduced through wireless communication. This ensures transmission performance between the first foldable part and the second foldable part. In addition, an increase of a transmit signal does not occupy rotation space. This improves a rate and a capacity in terms of signal transmission efficiency, provides scalability, and can accommodate a gradually increased quantity of bus signals.

DESCRIPTION OF EMBODIMENTS

The following describes embodiments of this application in detail. Examples of embodiments are shown in accompanying drawings. Same or similar reference signs are always used to represent same or similar elements or elements having same or similar functions. Embodiments described below with reference to the accompanying drawings are examples, and are intended to explain this application, but cannot be understood as a limitation on this application.

In the description of this application, it should be understood that orientation or position relationships indicated by terms "inside", "outside", and the like are based on orientation or position relationships shown in the accompanying drawings, which are used only for describing this application and simplifying the description, rather than indicating or implying that an apparatus or an element in question needs to have a specific orientation or needs to be constructed and operated in a specific orientation, and therefore cannot be construed as a limitation on this application.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of this application, "a plurality of" means two or more than two, unless otherwise specifically limited.

In this application, terms "installation", "connect", "connection", "fix", and the like should be understood in a broad sense unless otherwise expressly specified and limited. For example, the "connection" may be a fixed connection, a removable connection, or an integrated connection; may be a mechanical connection or an electrical connection; or may be a direct connection, an indirect connection through an intermediate medium, or a connection inside two components or a mutual relationship between two components. A person of ordinary skill in the art may interpret specific meanings of the foregoing terms in this application according to specific cases.

To make the objectives, technical solutions, and advantages of this application clearer and more comprehensible, the following further describes this application in detail with reference to the accompanying drawings and embodiments.

In the conventional technology, a foldable terminal generally includes a flexible display, an external communication antenna that is disposed on the flexible display and that is for signal transmission between the flexible display and the outside, and electronic control structures that are disposed on the flexible display and that are for internal signal transmission of the flexible display. The flexible display includes a first foldable part, a middle bending part, and a second foldable part that are connected in sequence. The electronic control structures may be a plurality of main circuit boards disposed on the first foldable part and the second foldable part. An electronic control structure on the first foldable part transmits a signal to an electronic control structure on the second foldable part through physical wiring such as a flexible circuit board and a radio frequency signal line as a communication carrier, to implement signal interconnection between the first foldable part and the second foldable part. As bending times of the flexible display increases, loss is generated on the physical wiring, which results in decreased mechanical strength, and affects transmission performance between the main circuit boards.

This application provides a foldable apparatus, including a foldable body 10, a first wireless communication chip 21, a second wireless communication chip 22, a first electronic control structure 23, a second electronic control structure 24, a first radiator 25, a second radiator 26, a support assembly 30, a coating medium 40, and a shield layer 50.

Figure 1:
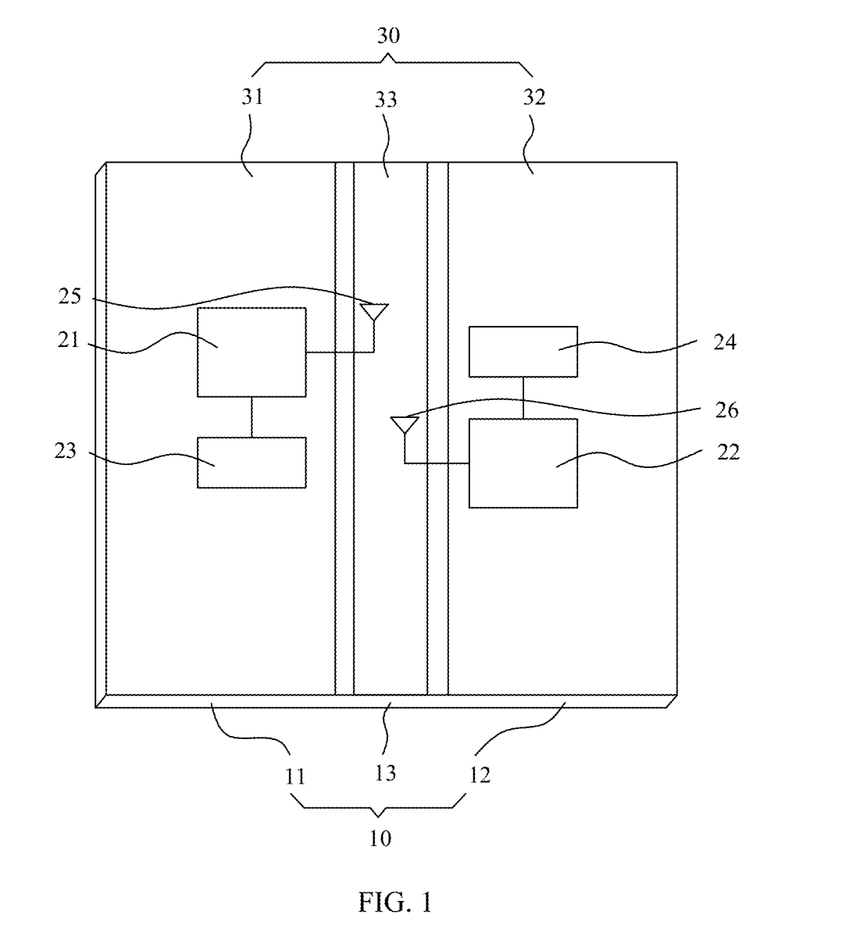
FIG. 1 is a schematic diagram of a structure of an embodiment of a foldable apparatus according to an embodiment of this application.
Figure 4:
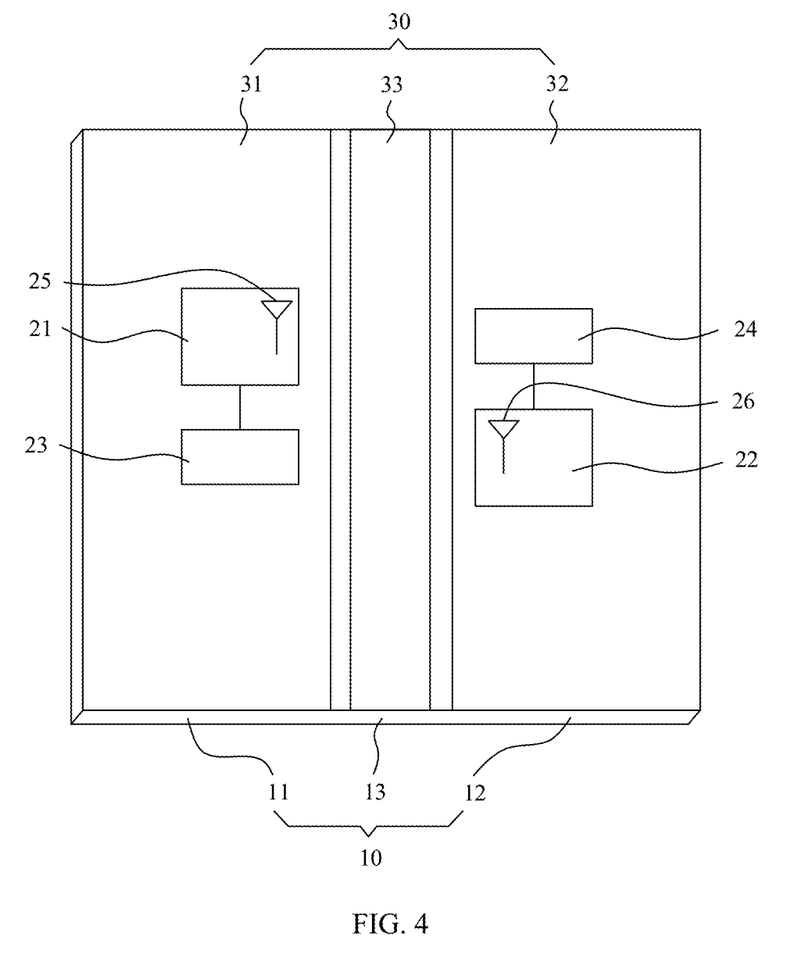
FIG. 4 is a schematic diagram of a structure of another embodiment of a foldable apparatus according to an embodiment of this application.
Figure 5:
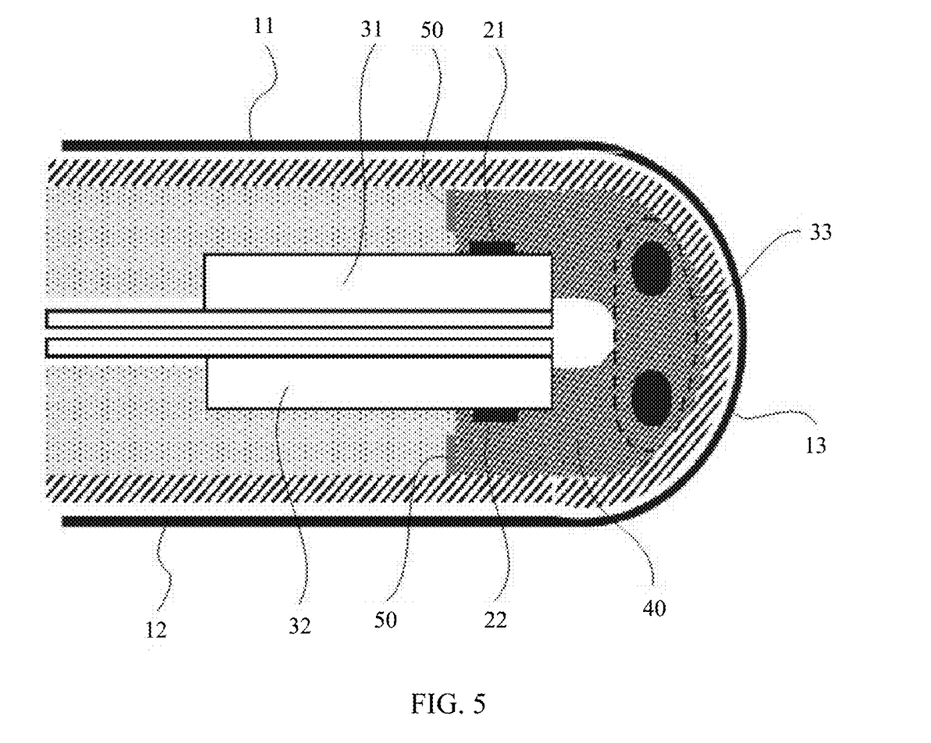
FIG. 5 is a schematic diagram of the foldable apparatus shown in FIG. 4 in a folded state.
Figure 6:
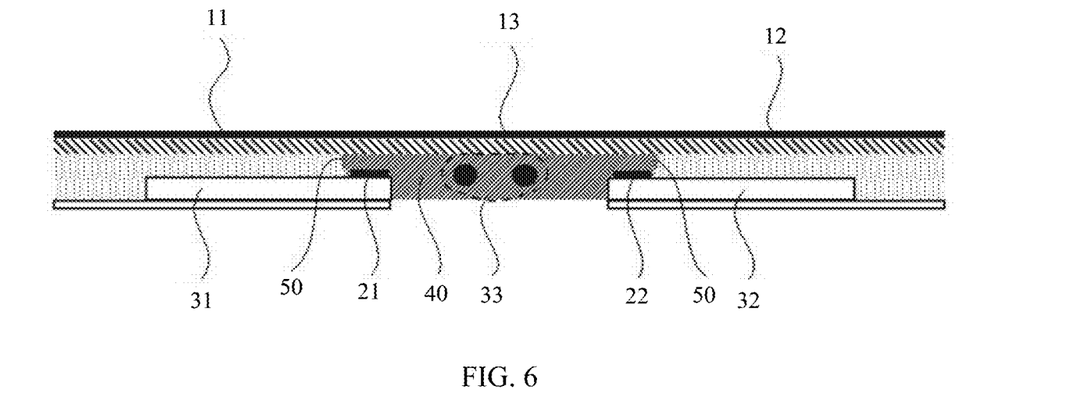
FIG. 6 is a schematic diagram of the foldable apparatus shown in FIG. 4 in an unfolded state.

Refer to FIG. 1 and FIG. 4. The foldable body 10 includes a first foldable part 11, a middle bending part 13, and a second foldable part 12 that are connected in sequence. The middle bending part 13 is a bendable structure. When the middle bending part 13 is bent, the first foldable part 11 and the second foldable part 12 may be disposed at an included angle, or may be parallel to each other, as shown in FIG. 5. When the middle bending part 13 is unfolded, the first foldable part 11, the second foldable part 12, and the middle bending part 13 are all located on a same plane, that is, the foldable body 10 is flat, as shown in FIG. 6. In this embodiment, the foldable body 10 may be a flexible display, or may be another carrier mechanism.

Refer to FIG. 1 and FIG. 4. The first wireless communication chip 21 is disposed in the first foldable part 11. The second wireless communication chip 22 is disposed in the second foldable part 12. The first foldable part 11 and the second foldable part 12 perform wireless communication by using the first wireless communication chip 21 and the second wireless communication chip 22. Specifically, rotation space corresponding to the middle bending part 13 is formed between the first wireless communication chip 21 and the second wireless communication chip 22, and a wireless communication link is formed between the first wireless communication chip 21 and the second wireless communication chip 22 in the rotation space, so that the first foldable part 11 and the second foldable part 12 implement wireless communication.

In the foldable apparatus, the first wireless communication chip 21 and the second wireless communication chip 22 are disposed, so that the first foldable part 11 and the second foldable part 12 can perform wireless communication by using the first wireless communication chip 21 and the second wireless communication chip 22. That is, wireless communication is used to replace conventional physical wiring for internal signal transmission. When the foldable body 10 is frequently bent for working, loss of a communication carrier is reduced through wireless communication. This ensures transmission performance between the first foldable part 11 and the second foldable part 12.

A conventional communication carrier is physical wiring. In transmission through the physical wiring, a quantity of physical wiring increases with an increase of transmit signals, which occupies rotation space, increases costs, and increases loss of the physical wiring. However, in this foldable apparatus, a bus signal is transmitted between a plurality of main control boards through a radio signal. An increase of the transmit signals does not occupy the rotation space, which improves a rate and a capacity in terms of signal transmission efficiency, provides scalability, and can accommodate a gradually increased quantity of bus signals.

The first electronic control structure 23, the first wireless communication chip 21, and the first radiator 25 are electrically connected in sequence and are all connected to the first foldable part 11, and the second electronic control structure 24, the second wireless communication chip 22, and the second radiator 26 are electrically connected in sequence and are all connected to the second foldable part 12. The first electronic control structure 23 and the second electronic control structure 24 each include a plurality of main control boards. The first wireless communication chip 21 implements aggregation of bus signals and/or radio frequency signals of the plurality of main control boards on the first foldable part 11, and converts the bus signals and/or the radio frequency signals into a first radio signal. The second wireless communication chip 22 implements aggregation of bus signals and/or radio frequency signals of the plurality of main control boards on the second foldable part 12, and converts the bus signals and/or the radio frequency signals into a second radio signal. In this way, the first electronic control structure 23 and the second electronic control structure 24 implement wireless transmission of the signals inside the foldable apparatus through coupling of the first radio signal and the second radio signal.

Refer to FIG. 1 and FIG. 4. The support assembly 30 is configured to support the foldable body 10, and includes a first support plate 31, a rotating shaft 33, and a second support plate 32 that are connected in sequence. The first support plate 31 is rotationally connected to the second support plate 32 through the rotating shaft 33. The first support plate 31 is connected to and supports the first foldable part 11, the second support plate 32 is connected to and supports the second foldable part 12, and the rotating shaft 33 corresponds to the middle bending part 13 and is located in the rotation space. In this embodiment, both the first support plate 31 and the second support plate 32 are flat and are configured to ensure flatness of the flexible display or another carrier mechanism, thereby avoiding collapse of the flexible display when a user touches the flexible display, and bending of the first foldable part 11 and the second foldable part 12. When the first support plate 31 and the second support plate 32 rotate relative to the rotating shaft 33, an included angle between the first support plate 31 and the second support plate 32 may be adjusted as required. The first support plate 31 and the second support plate 32 may be folded to overlap. In this case, the first foldable part 11 and the second foldable part 12 may be located respectively on a side of the first support plate 31 and a side of the second support plate 32 that are opposite to each other, or may be located respectively on a side of the first support plate 31 and a side of the second support plate 32 that face each other. An arrangement of the rotating shaft 33 improves strength and stability of the middle bending part 13, and relieves pulling on the middle bending part 13 when the foldable body 10 is in use. When the signal is transmitted through conventional physical wiring, because the physical wiring needs to pass through the rotating shaft 33, internal space of the rotating shaft 33 is occupied, and strength of the rotating shaft 33 is reduced. In this foldable apparatus, signal interconnection is implemented through wireless communication, the physical wiring does not need to pass through the rotating shaft 33, and connections between the physical wiring and the first electronic control structure 23 and the second electronic control structure 24 are canceled. This improves integrity of the rotating shaft 33, ensures strength and stability of the rotating shaft 33, and reduces processing complexity of the rotating shaft 33. When there are a large quantity of bending times, loss of the rotating shaft 33 is reduced, and deterioration of communication performance is prevented. The rotating shaft 33 may be fixedly connected to either the first support plate 31 or the second support plate 32 and rotationally connected to the other. However, this causes a case in which the first support plate 31 and the second support plate 32 cannot be overlapped. In this embodiment, a cross section of the rotating shaft 33 is approximately an ellipse, and the rotating shaft 33 has two rotation axes disposed at an interval and in parallel. The first support plate 31 and the second support plate 32 each rotate relative to a rotation axis, so that the first support plate 31 and the second support plate 32 that have a specific thickness can fully overlap. Optionally, the rotating shaft 33 is divided into two sides by a connection line between the two rotation axes. A wall surface of one side is a convex arc surface, and a wall surface of the other side is a plane. When rotating, the first support plate 31 and the second support plate 32 rotate towards one side of the plane of the rotating shaft 33, to prevent the rotating shaft 33 from limiting a rotation angle of the first support plate 31 or the second support plate 32. The foldable body 10 is located on one side of the arc surface of the rotating shaft 33, so that a bending amplitude of the middle bending part 13 is smooth, thereby reducing a breakage degree of the foldable body 10, and prolonging a service life of the foldable body 10. The first support plate 31 and the second support plate 32 may be directly connected to the rotating shaft 33, or may be connected to the rotating shaft 33 by using another structure or medium.

Refer to FIG. 1 and FIG. 4. The first wireless communication chip 21 is configured to transmit the bus signal and/or the radio frequency signal in the first electronic control structure 23 to the first radiator 25. The second wireless communication chip 22 is configured to transmit the bus signal and/or the radio frequency signal in the second electronic control structure 24 to the second radiator 26. The first wireless communication chip 21 and the second wireless communication chip 22 perform wireless communication through the first radiator 25 and the second radiator 26.

When a bus signal and a radio frequency signal need to be transmitted between conventional main control boards, the bus signal is transmitted through a flexible circuit board, and the radio frequency signal is transmitted through a radio frequency signal line. The first wireless communication chip 21 in this application aggregates and converts the bus signal and the radio frequency signal that need to be transmitted by the first electronic control structure 23 into a high frequency millimeter-wave signal in the first radiator 25 for wireless transmission towards the second radiator 26. The second wireless communication chip 22 aggregates and converts the bus signal and the radio frequency signal that need to be transmitted by the second electronic control structure 24 into a high frequency millimeter-wave signal in the second radiator 26 for wireless transmission towards the first radiator 25. In this way, a wireless communication link is established inside the foldable apparatus through the first radiator 25 and the second radiator 26, and is used to replace physical wiring used for signal transmission, the high frequency signal is transmitted at a high rate, and wireless transmission of the bus signal is implemented between the first electronic control structure 23 and the second electronic control structure 24.

In one embodiment, refer to FIG. 1. The first radiator 25 and the second radiator 26 are disposed on the rotating shaft 33 and are spaced apart. The first wireless communication chip 21 aggregates and converts the bus signal and/or the radio frequency signal that need to be transmitted by the first electronic control structure 23 into the high frequency millimeter-wave signal in the first radiator 25 for wireless transmission inside the rotating shaft 33. The second wireless communication chip 22 aggregates and converts the bus signal and/or the radio frequency signal that need to be transmitted by the second electronic control structure 24 into the high frequency millimeter-wave signal in the second radiator 26 for wireless transmission inside the rotating shaft 33. In this way, a wireless communication link inside the rotating shaft 33 is established through the first radiator 25 and the second radiator 26 on both sides of the rotating shaft 33, and is used to replace physical wiring used for signal transmission, the high frequency signal is transmitted at a high rate, and wireless transmission of the bus signal is implemented between the first electronic control structure 23 and the second electronic control structure 24. When both the first radiator 25 and the second radiator 26 are disposed on the rotating shaft 33, a distance between the first radiator 25 and the second radiator 26 is shortened. In addition, the rotating shaft 33 may also be used as a medium for facilitating signal transmission to perform auxiliary transmission. This improves a transmission speed between the first radiator 25 and the second radiator 26.

Figure 2:
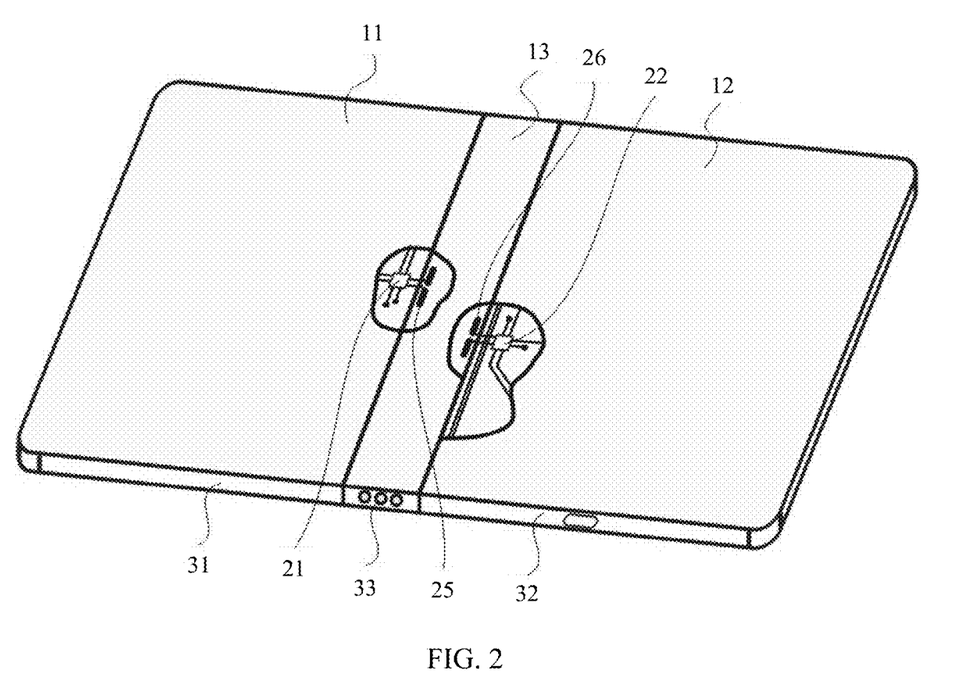
FIG. 2 is a schematic diagram of the foldable apparatus shown in FIG. 1 when both a first radiator and a second radiator are millimeter-wave antennas.

Refer to FIG. 2. In an implementation, the first radiator 25 and the second radiator 26 may be millimeter-wave antennas, and the first radiator 25 and the second radiator 26 perform wireless communication through a millimeter-wave signal. This implements high-performance signal transmission in a short distance and low power condition. The millimeter-wave antenna may include a metal sheet, or may be a flexible circuit board partially extending into the rotating shaft 33, or may be a conducting layer formed on the rotating shaft 33 by using a process such as spraying or printing. The millimeter-wave antenna is highly compatible with the rotating shaft 33, and can use space of the rotating shaft 33 to a maximum extent. That is, conformality between the millimeter-wave antenna and the rotating shaft 33 is good. Space of a structure of the rotating shaft 33 does not need to be significantly increased, and structure stability of the rotating shaft 33 is not affected.

Figure 3:
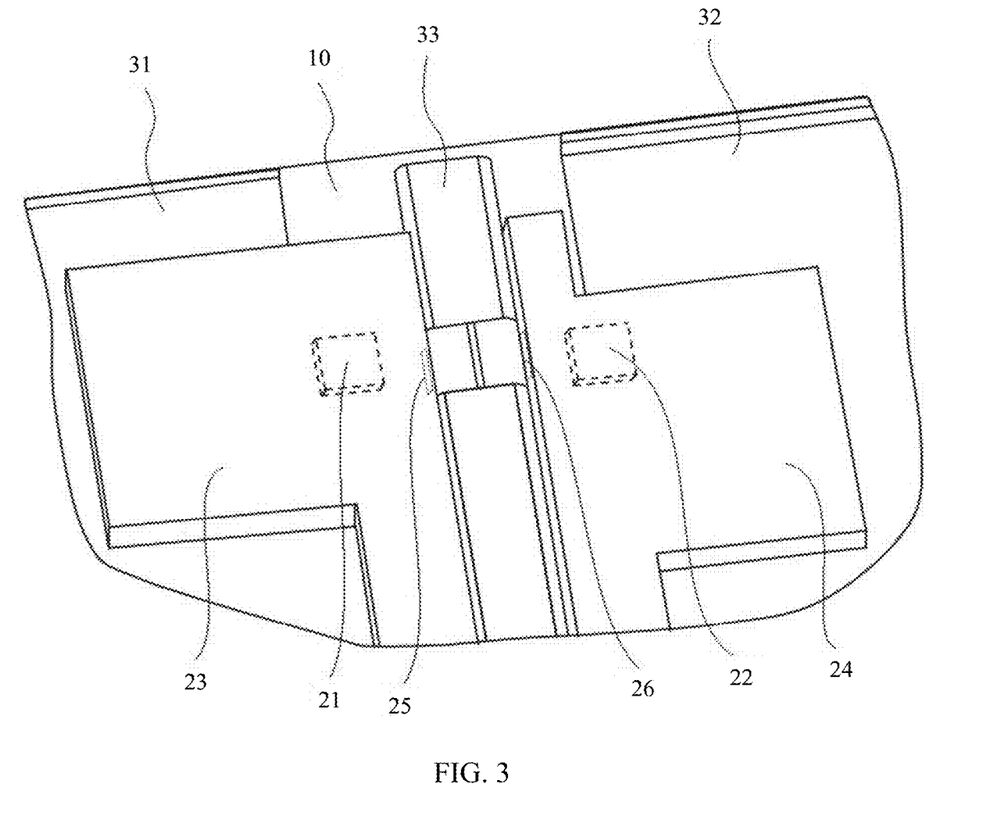
FIG. 3 is a schematic diagram of the foldable apparatus shown in FIG. 1 when both a first radiator and a second radiator are slot antennas.

Refer to FIG. 3. In another implementation, both the first radiator 25 and the second radiator 26 are slot antennas formed through slotting on the rotating shaft 33. Specifically, one or several slot-shaped slots are disposed on each of two radial sides of the rotating shaft 33 to form slot antennas, and the slot antennas are electrically connected to the first wireless communication chip 21 and the second wireless communication chip 22 respectively on the two sides. Each slot antenna can form slot radiation to couple signals, so as to radiate or receive a radio signal transmitted internally. Each slot antenna extends along an axial direction of the rotating shaft 33, and may be disposed at a same height or a different height. The slot antenna is also highly compatible with the rotating shaft 33, and can use space of the rotating shaft 33 to a maximum extent. That is, conformality between the slot antenna and the rotating shaft 33 is good. Space of a structure of the rotating shaft 33 does not need to be largely occupied, and structure stability of the rotating shaft 33 is not affected. To ensure stable wireless transmission performance in the foldable device at different opening and closing angles, antenna performance in different use states needs to be considered, or a radiation structure needs to be designed at different positions of the rotating shaft 33.

Refer to FIG. 4. In another embodiment, the first radiator 25 is integrated into the first wireless communication chip 21, and the second radiator 26 is integrated into the second wireless communication chip 22. The first wireless communication chip 21 is disposed at a position that is of the first foldable part 11 and close to the rotating shaft 33, the first radiator 25 is disposed at a position that is of the first wireless communication chip 21 and close to the rotating shaft 33, the second wireless communication chip 22 is disposed at a position that is of the second foldable part 12 and close to the rotating shaft 33, and the second radiator 26 is disposed at a position that is of the second wireless communication chip 22 and close to the rotating shaft 33. In this way, the first radiator 25 and the second radiator 26 do not occupy space in an internal structure of the rotating shaft 33 and do not affect the structure of the rotating shaft 33. This improves stability of the rotating shaft 33, and facilitates assembly of the foldable apparatus and replacement of components.

Refer to FIG. 5 and FIG. 6. To improve signal transmission performance between the first radiator 25 and the second radiator 26, the coating medium 40 covers the first radiator 25 and the second radiator 26. In this way, the first radiator 25 and the second radiator 26 perform signal transmission through the coating medium 40. This facilitates signal interconnection and improves a transmission speed. The coating medium 40 also covers the rotating shaft 33, and the coating medium 40 ensures stability of radio signal transmission inside the rotating shaft 33 device. In this embodiment, the coating medium 40 is a non-metallic material, such as plastic or air. The first support plate 31 and the second support plate 32 may be connected to the rotating shaft 33 through the coating medium 40. In this case, the coating medium 40 is made of a flexible material. The coating medium 40 enhances connections between the first radiator 25 and the second radiator 26 and the rotating shaft 33 or a carrier thereof, and improves mechanical strength of the first radiator 25 and the second radiator 26. This avoids a case in which the first radiator 25 and the second radiator 26 are broken or have poor electrical connections to the first wireless communication chip 21 and the second wireless communication chip 22.

Refer to FIG. 5 and FIG. 6. To prevent signal leakage in the first radiator 25 and the second radiator 26, the shield layer 50 is disposed on an outer layer of the coating medium 40. The shield layer 50 is used to isolate a signal in the coating medium 40 from an external signal, so as to prevent the millimeter-wave signal transmitted or received by the first radiator 25 and the second radiator 26 from being interfered with or interfering with another signal. This ensures stable transmission in different folded states. The shield layer 50 may wrap an outer layer of the coating medium 40, or may be disposed in a region in which the coating medium 40 is not in contact with another component in the foldable apparatus. The shield layer 50 may be a metal coating, or may be a flexible or rigid metal mechanical part. The shield layer 50 may use different architecture solutions based on different structures of the rotating shaft 33, to meet structure requirements and ensure bus transmission performance.

This application further provides a terminal device, including the foldable apparatus provided in the foregoing embodiments. The foldable apparatus and the foldable apparatus in the foregoing embodiments have the same structural features and functions, and details are not described herein again. The foldable body 10 may be a flexible display, or may be another carrier structure. The terminal device may be a mobile phone, a tablet computer, or the like that has a flexible display.

The foregoing descriptions are embodiments of this application, but are not intended to limit this application. Any modification, equivalent replacement, or improvement made without departing from the spirit and principle of this application should fall within the protection scope of this application.

What is claimed is:

1. A foldable apparatus comprising:
a foldable body, comprising a first foldable part, a middle bending part, and a second foldable part that are connected in sequence, wherein the first foldable part and the second foldable part are able to rotate relative to each other based on the middle bending part, and
wherein a first wireless communication chip is disposed in the first foldable part, a second wireless communication chip is disposed in the second foldable part, and the first foldable part and the second foldable part perform wireless communication by using the first wireless communication chip and the second wireless communication chip, and wherein the wireless communication is between the first communication chip and the second communication chip.

2. The foldable apparatus according to claim 1, further comprising: a support assembly, which comprises a first support plate, a rotating shaft, and a second support plate that are connected in sequence, wherein the first support plate is rotationally connected to the second support plate through the rotating shaft, the first support plate is connected to and supports the first foldable part, the second support plate is connected to and supports the second foldable part, and the rotating shaft is disposed opposite to the middle bending part.

3. The foldable apparatus according to claim 1, wherein the first wireless communication chip is electrically connected to a first electronic control structure and a first radiator, the first electronic control structure is disposed in the first foldable part and is electrically connected to the first foldable part, the first wireless communication chip is configured to transmit a first bus signal and/or a radio frequency signal in the first electronic control structure to the first radiator,
wherein the second wireless communication chip is electrically connected to a second electronic control structure and a second radiator, the second electronic control structure is disposed in the second foldable part and is electrically connected to the second foldable part, the second wireless communication chip is configured to transmit a second bus signal and/or a radio frequency signal in the second electronic control structure to the second radiator, and
wherein the first wireless communication chip and the second wireless communication chip perform wireless communication through the first radiator and the second radiator.

4. The foldable apparatus according to claim 3, wherein the first radiator and the second radiator are disposed on the rotating shaft and are spaced apart.

5. The foldable apparatus according to claim 4, wherein both the first radiator and the second radiator are millimeter-wave antennas.

6. The foldable apparatus according to claim 4, wherein both the first radiator and the second radiator are slot antennas formed through slotting on the rotating shaft.

7. The foldable apparatus according to claim 3, wherein the first radiator is integrated into the first wireless communication chip, and the second radiator is integrated into the second wireless communication chip.

8. The foldable apparatus according to claim 3, further comprising: a coating medium covering the first radiator and the second radiator.

9. The foldable apparatus according to claim 8, further comprising: a shield layer disposed on an outer layer of the coating medium and configured to isolate a signal in the coating medium from an external signal.

10. The foldable apparatus according to claim 1, wherein the first wireless communication chip and the second wireless communication chip lack an interconnection by physical wiring for internal signal transmission.

11. A terminal device comprising:
a display; and
a first wireless communication chip;
a second wireless communication chip; and
a foldable body, comprising a first foldable part, a middle bending part, and a second foldable part that are connected in sequence, wherein the first foldable part and the second foldable part are able to rotate relative to each other based on the middle bending part, and
wherein the first wireless communication chip is disposed in the first foldable part, the second wireless communication chip is disposed in the second foldable part, and the first foldable part and the second foldable part perform wireless communication by using the first wireless communication chip and the second wireless communication chip, and wherein the wireless communication is between the first communication chip and the second communication chip.

12. The terminal device according to claim 11, further comprising: a support assembly, which comprises a first support plate, a rotating shaft, and a second support plate that are connected in sequence, wherein the first support plate is rotationally connected to the second support plate through the rotating shaft, the first support plate is connected to and supports the first foldable part, the second support plate is connected to and supports the second foldable part, and the rotating shaft is disposed opposite to the middle bending part.

13. The terminal device according to claim 11, wherein the first wireless communication chip is electrically connected to a first electronic control structure and a first radiator, the first electronic control structure is disposed in the first foldable part and is electrically connected to the first foldable part, the first wireless communication chip is configured to transmit a first bus signal and/or a radio frequency signal in the first electronic control structure to the first radiator,
wherein the second wireless communication chip is electrically connected to a second electronic control structure and a second radiator, the second electronic control structure is disposed in the second foldable part and is electrically connected to the second foldable part, the second wireless communication chip is configured to transmit a second bus signal and/or a radio frequency signal in the second electronic control structure to the second radiator, and
wherein the first wireless communication chip and the second wireless communication chip perform wireless communication through the first radiator and the second radiator.

14. The terminal device according to claim 13, wherein the first radiator and the second radiator are disposed on the rotating shaft and are spaced apart.

15. The terminal device according to claim 14, wherein both the first radiator and the second radiator are millimeter-wave antennas.

16. The terminal device according to claim 14, wherein both the first radiator and the second radiator are slot antennas formed through slotting on the rotating shaft.

17. The terminal device according to claim 13, wherein the first radiator is integrated into the first wireless communication chip, and the second radiator is integrated into the second wireless communication chip.

18. The terminal device according to claim 13, further comprising:
a coating medium covering the first radiator and the second radiator; and
a shield layer disposed on an outer layer of the coating medium and configured to isolate a signal in the coating medium from an external signal.

19. The terminal device according to claim 11, wherein the first wireless communication chip and the second wireless communication chip lack an interconnection by physical wiring for internal signal transmission.

* * * * *